United States Patent
Terashita et al.

(10) Patent No.: US 11,195,660 B2
(45) Date of Patent: Dec. 7, 2021

(54) MULTILAYER CERAMIC ELECTRONIC COMPONENT, AND MOUNTING STRUCTURE FOR MULTILAYER CERAMIC ELECTRONIC COMPONENT

(71) Applicant: Murata Manufacturing Co., Ltd., Nagaokakyo (JP)

(72) Inventors: Yosuke Terashita, Nagaokakyo (JP); Katsumi Oka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/590,482

(22) Filed: Oct. 2, 2019

(65) Prior Publication Data

US 2020/0118761 A1  Apr. 16, 2020

(30) Foreign Application Priority Data

Oct. 10, 2018  (JP) .............................. JP2018-191903

(51) Int. Cl.
  *H01G 4/30*  (2006.01)
  *H01G 4/008*  (2006.01)
  *H01G 4/12*  (2006.01)
  *H01G 4/232*  (2006.01)

(52) U.S. Cl.
  CPC .............. *H01G 4/30* (2013.01); *H01G 4/008* (2013.01); *H01G 4/1209* (2013.01); *H01G 4/2325* (2013.01)

(58) Field of Classification Search
  CPC ........ H01G 4/30; H01G 4/008; H01G 4/1209; H01G 4/2325
  See application file for complete search history.

(56) References Cited

U.S. PATENT DOCUMENTS

| | | | |
|---|---|---|---|
| 6,310,757 B1* | 10/2001 | Tuzuki | H01C 1/142 29/25.41 |
| 2010/0091426 A1 | 4/2010 | Motoki et al. | |
| 2012/0314336 A1 | 12/2012 | Ogawa et al. | |
| 2014/0373324 A1 | 12/2014 | Hamanaka et al. | |

(Continued)

FOREIGN PATENT DOCUMENTS

| JP | 05-283273 A | 10/1993 |
|---|---|---|
| JP | 2001-035740 A | 2/2001 |

(Continued)

OTHER PUBLICATIONS

Official Communication issued in corresponding Japanese Patent Application No. 2018-191903, dated Jul. 20, 2021.

*Primary Examiner* — Nathan Milakovich
(74) *Attorney, Agent, or Firm* — Keating & Bennett, LLP

(57) ABSTRACT

A multilayer ceramic capacitor includes a laminate and an outer electrode. The laminate includes a plurality of laminated ceramic layers and a plurality of internal electrode layers. The internal electrode layers are respectively laminated on the ceramic layers. The outer electrode is provided on each end surface of the laminate. Each outer electrode includes a metal layer. The metal layer includes at least a Pd layer, an Ni layer, and an Sn layer laminated from a portion adjacent to or in a vicinity of the laminate in order of the Pd layer, the Ni layer, and the Sn layer. The metal layer is located at an outermost surface of the outer electrode. A thickness of the Ni layer is greater than or equal to about 0.4.

19 Claims, 5 Drawing Sheets

(56) References Cited

U.S. PATENT DOCUMENTS

| | | | |
|---|---|---|---|
| 2016/0071647 A1* | 3/2016 | Nishisaka | H01G 4/0085 |
| | | | 361/301.4 |
| 2016/0381802 A1* | 12/2016 | Taniguchi | H05K 1/0243 |
| | | | 174/260 |
| 2017/0032896 A1* | 2/2017 | Otani | H01G 4/232 |
| 2017/0330689 A1* | 11/2017 | Hatanaka | H01G 4/30 |
| 2018/0061577 A1 | 3/2018 | Yasuda | |
| 2018/0068792 A1* | 3/2018 | Egashira | H01G 4/248 |
| 2018/0308631 A1* | 10/2018 | Shinohara | H01F 27/327 |
| 2019/0304683 A1* | 10/2019 | Terashita | H01G 2/065 |
| 2020/0265999 A1* | 8/2020 | Ruma | H01G 4/30 |
| 2020/0312571 A1* | 10/2020 | Yatagawa | H01G 4/012 |
| 2021/0057154 A1* | 2/2021 | Zenzai | H01G 4/2325 |
| 2021/0183581 A1* | 6/2021 | Nakano | H01G 2/065 |
| 2021/0202160 A1* | 7/2021 | Takai | H01F 17/0013 |
| 2021/0202161 A1* | 7/2021 | Takai | H01F 27/34 |
| 2021/0202162 A1* | 7/2021 | Takai | H01F 17/0013 |
| 2021/0202163 A1* | 7/2021 | Takai | H01F 27/324 |

FOREIGN PATENT DOCUMENTS

| | | |
|---|---|---|
| JP | 2010-093112 A | 4/2010 |
| JP | 2012-253292 A | 12/2012 |
| JP | 2014-170875 A | 9/2014 |
| JP | 2015-026815 A | 2/2015 |
| JP | 2018-037473 A | 3/2018 |

\* cited by examiner

MULTILAYER CERAMIC ELECTRONIC COMPONENT, AND MOUNTING STRUCTURE FOR MULTILAYER CERAMIC ELECTRONIC COMPONENT

CROSS REFERENCE TO RELATED APPLICATIONS

This application claims the benefit of priority to Japanese Patent Application No. 2018-191903 filed on Oct. 10, 2018. The entire contents of this application are hereby incorporated herein by reference.

BACKGROUND OF THE PRESENT INVENTION

1. Field of the Present Invention

The present invention relates to a multilayer ceramic electronic component and a mounting structure for the multilayer ceramic electronic component.

2. Description of the Related Art

An existing outer electrode structure of a multilayer ceramic electronic component generally includes a base electrode layer, Ni plating, and Sn plating. The base electrode layer is formed by applying Cu or Ag electrically conductive paste and firing the paste. The Ni plating is formed by plating. The Sn plating is formed by plating. The Ni plating is formed on the base electrode layer, and the Sn plating is further formed on the Ni plating. With respect to the functions of the Ni plating and Sn plating, a Ni plating layer functions as a barrier layer against leaching of an outer electrode to solder (known as solder leaching) at the time of mounting, and an Sn plating layer functions as a wetting material for making solder easy to wet all over a terminal electrode.

To mount a multilayer ceramic electronic component including such an outer electrode structure, tin-lead eutectic solder has been generally used. Most tin-lead eutectic solders have a low melting point. Tin-lead eutectic solders have good solderability, and allow mounting at a relatively low temperature.

However, in recent years, with consideration for the environment, lead-free solders with a higher melting point than eutectic solders have been increasingly employed. For this reason, increasing the temperature at the time of mounting is required. Ordinarily, the Ni plating layer reduces or prevents a phenomenon called solder leaching. The solder leaching is the phenomenon that Ni plating and Cu or Ag in a base electrode layer dissolve into a solder solution at the time of melting solder and, as a result, a portion of the outer electrode or the entire outer electrode disappears. However, there is a concern that the function of the Ni plating layer does not work because of a high temperature at the time of mounting. Specifically, there is a concern that, when an active dissolution of the Ni plating and Cu or Ag in the base electrode layer into the solder solution occurs and then a thin portion of the Ni plating disappears, solder contacts with the base electrode layer to dissolve Ag, Cu, or the like. There is also a concern that, when the Ni plating is not dense, molten solder penetrates into the base electrode layer through grain boundaries and causes solder leaching.

Furthermore, in recent years, multilayer ceramic electronic components have been increasingly used in a further high-temperature environment, mainly, as multilayer ceramic electronic components in the in-vehicle market (such as SiC-PM). When a multilayer ceramic electronic component is used in such a high-temperature environment, an Ni layer that inhibits solder leaching is exposed to high temperature over time. As a result, as in the case of the above, an active dissolution of the Ni plating and Cu or Ag in the base electrode layer occurs, and then a thin portion of the Ni plating disappears. Therefore, there is a concern that, when solder contacts with the base electrode layer to dissolve Ag, Cu, or the like. There is also a concern that, when the Ni layer is not dense, molten solder penetrates into the base electrode layer through grain boundaries to cause solder leaching.

A method of thickening the Ni plating is initially conceived as a method of solving the above problem. However, when the Ni plating is too thick, the total thickness of the outer electrode increases. This adversely affects capacitance design for a multilayer ceramic electronic component. In addition, when the Ni plating is too thick, stress increases in the Ni plating, so there is a concern that the Ni plating peels off. Peeling often occurs at the interface between the Ni plating and the base electrode layer or the interface between the base electrode layer and a laminate. In any case, it is conceivable that solder penetrates into a peeled portion and causes large solder leaching to occur around the peeled portion at the time of mounting.

Furthermore, as another method, for example, Japanese Unexamined Patent Application Publication No. 5-283273 describes a technique for inhibiting solder leaching by making an upper layer of an outer electrode from Pd or an alloy containing Pd.

Solder leaching occurs by the following mechanism.

That is, solder leaching means the phenomenon that an Ni layer and Cu or Ag in a base electrode layer dissolve into a solder solution at the time when solder melts and then a portion of the outer electrode or the entire outer electrode disappears. As a metal contacts with molten solder, the metal forms an alloy and dissolves into the molten solder solution even when the temperature of the solder solution is lower than or equal to the melting point of the metal. Ni is less likely to dissolve into a solder solution; however, when the temperature of the solution is high, an active dissolution of Ni occurs. Then, a thin portion of the Ni layer disappears, and solder contacts with the base electrode layer. As a result, the solder dissolves Ag, Cu, or the like. In addition, when the Ni layer is not dense, molten solder penetrates into the base electrode layer through grain boundaries to cause solder leaching. When the Ni layer includes a pin hole, or when there is peeling between the Ni layer and the base electrode layer or between the base electrode layer and an element assembly, a metal that is a component of the base electrode layer directly contacts with molten solder. As a result, large solder leaching occurs around the pin hole portion or the peeled portion.

With the structure described in Japanese Unexamined Patent Application Publication No. 5-283273, for example, in a high-temperature use environment, such as an environment at temperatures above 175 degrees C., Pd plating inhibits short-time solder leaching at the time of mounting; however, the phenomenon that the Pd plating is continuously leached over time by lead-free solder (LF solder) as a result of a long-term use in a high-temperature environment occurs. Therefore, the effect of inhibiting solder leaching is not sufficient. As a result, a mechanical and electrical joint failure has sometimes occurred.

SUMMARY OF THE PRESENT INVENTION

Preferred embodiments of the present invention provide multilayer ceramic electronic components and mounting structures for multilayer ceramic electronic components, which are able to reduce a mechanical and electrical joint failure by reducing or preventing solder leaching.

A multilayer ceramic electronic component according to a preferred embodiment of the present invention includes a laminate and an outer electrode. The laminate includes a plurality of laminated ceramic layers and a plurality of internal electrode layers. The internal electrode layers are respectively laminated on the ceramic layers. The laminate includes a first main surface and a second main surface on opposite sides in a lamination direction, a first end surface and a second end surface on opposite sides in a longitudinal direction perpendicular or substantially perpendicular to the lamination direction, and a first side surface and a second side surface on opposite sides in a width direction perpendicular or substantially perpendicular to the lamination direction and the longitudinal direction. The outer electrode is located on each of the first end surface and the second end surface. Each outer electrode includes a metal layer. The metal layer includes at least a Pd layer, an Ni layer, and an Sn layer laminated from a portion adjacent to or in a vicinity of the laminate in order of the Pd layer, the Ni layer, and the Sn layer. The metal layer is located at an outermost surface of the outer electrode. A thickness of the Ni layer is greater than or equal to about 0.4 µm.

A mounting structure for a multilayer ceramic electronic component according to a preferred embodiment of the present invention is a mounting structure for a multilayer ceramic electronic component mounted on a circuit board. The mounting structure includes a laminate and an outer electrode. The laminate includes a plurality of laminated ceramic layers and a plurality of internal electrode layers. The internal electrode layers are respectively laminated on the ceramic layers. The laminate includes a first main surface and a second main surface on opposite sides in a lamination direction, a first end surface and a second end surface on opposite sides in a longitudinal direction perpendicular or substantially perpendicular to the lamination direction, and a first side surface and a second side surface on opposite sides in a width direction perpendicular or substantially perpendicular to the lamination direction and the longitudinal direction. The outer electrode is located on each of the first end surface and the second end surface. Each outer electrode includes a metal layer. The metal layer includes at least a Pd layer, an Ni layer, and an Sn layer laminated from a portion adjacent to or in a vicinity of the laminate in order of the Pd layer, the Ni layer, and the Sn layer. The metal layer is located at an outermost surface of the outer electrode. A thickness of the Ni layer is greater than or equal to about 0.4 µm. The multilayer ceramic electronic component is mounted on land electrodes on the circuit board by lead-free solder.

According to preferred embodiments of the present invention, multilayer ceramic electronic components and mounting structures for multilayer ceramic electronic components, which are able to reduce a mechanical and electrical joint failure by reducing or preventing solder leaching, are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the accompanying drawings.

1. Multilayer Ceramic Electronic Component

Figure 1:
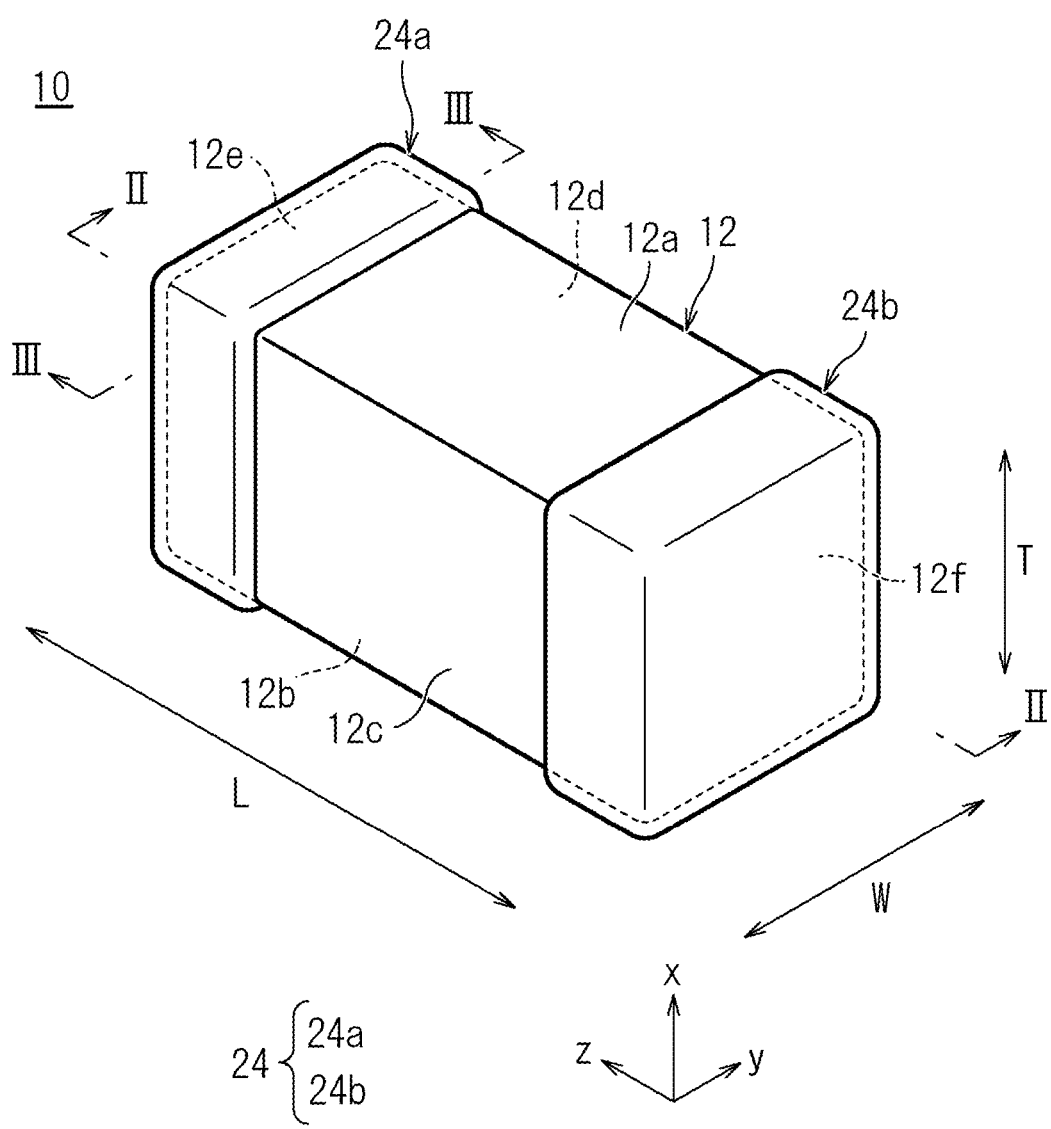
FIG. 1 is an external perspective view showing one example of a multilayer ceramic capacitor according to a preferred embodiment of the present invention.
Figure 2A:
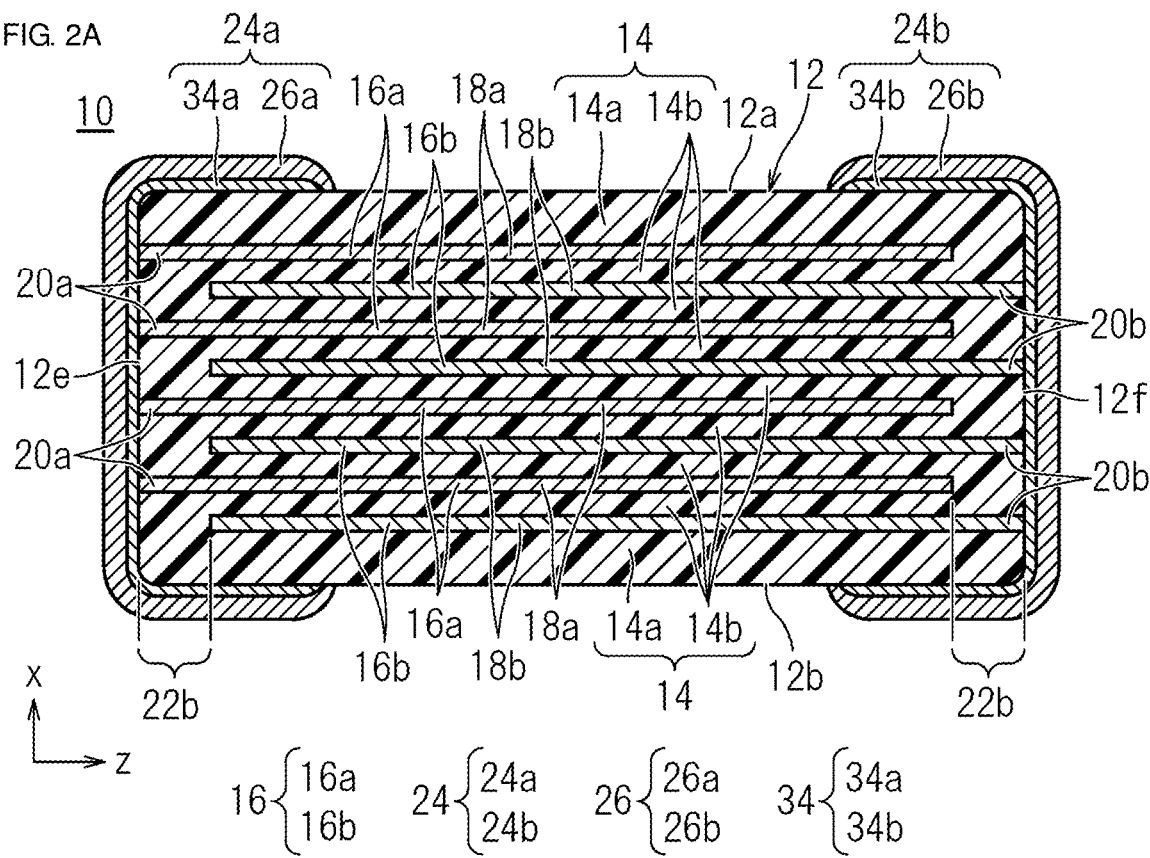
FIG. 2A is a cross-sectional view taken along the line II-II in FIG. 1 and showing a multilayer ceramic capacitor according to a preferred embodiment of the present invention.
Figure 2B:
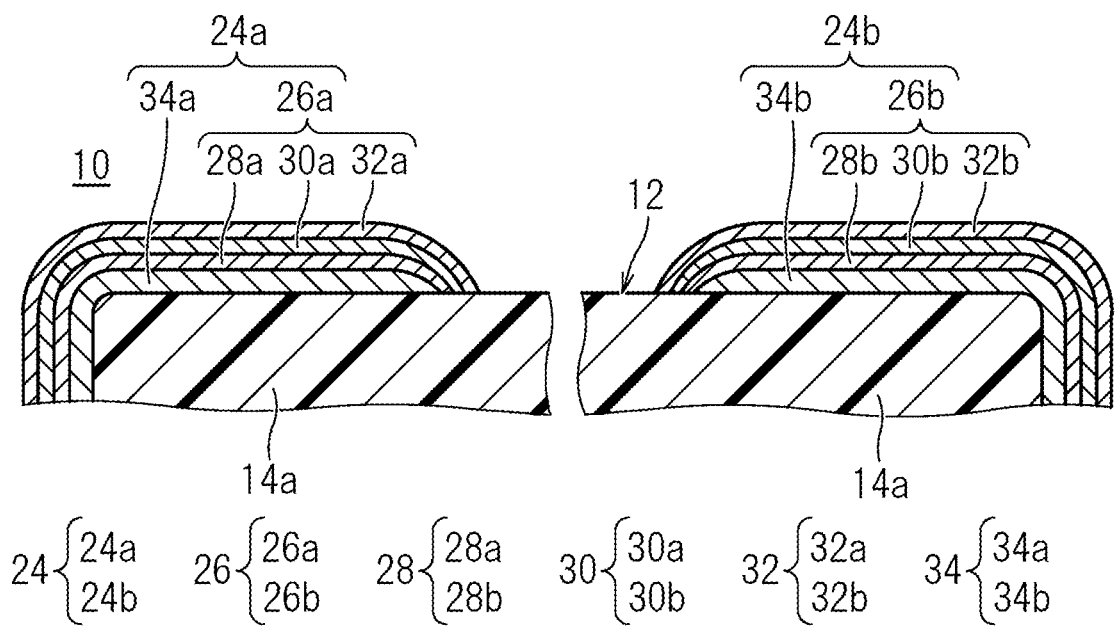
FIG. 2B is an enlarged view of outer electrodes and portions near the outer electrodes in FIG. 2A.
Figure 3:
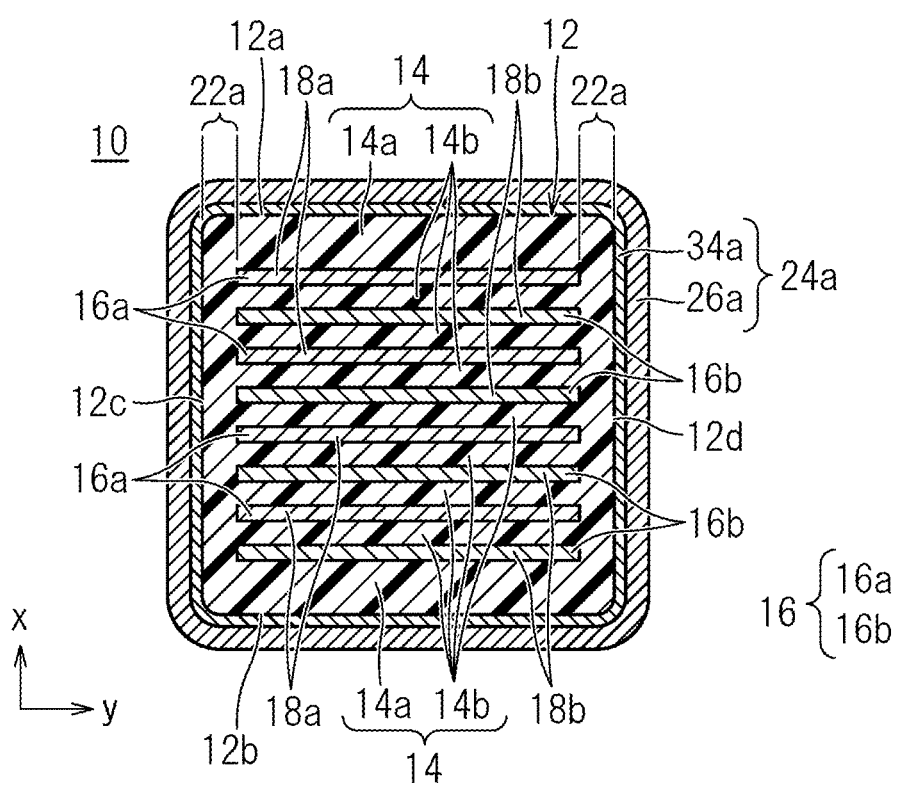
FIG. 3 is a cross-sectional view taken along the line in FIG. 1 and showing a multilayer ceramic capacitor according to a preferred embodiment of the present invention.

A multilayer ceramic capacitor will be described as a preferred embodiment of the present invention with respect to multilayer ceramic electronic component of the present invention. FIG. 1 is an external perspective view showing one example of the multilayer ceramic capacitor according to a preferred embodiment of the present invention. FIG. 2A is a cross-sectional view taken along the line II-II in FIG. 1 and showing the multilayer ceramic capacitor according to a preferred embodiment of the present invention. FIG. 2B is an enlarged view of outer electrodes and portions near the outer electrodes in FIG. 2A. FIG. 3 is a cross-sectional view taken along the line III-III in FIG. 1 and showing the multilayer ceramic capacitor according to a preferred embodiment of the present invention.

As shown in FIG. 1 to FIG. 3, the multilayer ceramic capacitor 10 includes a laminate 12 with a rectangular or substantially rectangular parallelepiped shape.

The laminate 12 includes a plurality of ceramic layers 14 and a plurality of internal electrode layers 16. The ceramic layers 14 and the internal electrode layers 16 are laminated. The laminate 12 includes a first main surface 12a, a second main surface 12b, a first side surface 12c, a second side surface 12d, a first end surface 12e, and a second end surface 12f. The first main surface 12a and the second main surface 12b are on opposite sides in a lamination direction x. The first side surface 12c and the second side surface 12d are on opposite sides in a width direction y perpendicular or substantially perpendicular to the lamination direction x. The first end surface 12e and the second end surface 12f are on opposite sides in a longitudinal direction z perpendicular or substantially perpendicular to the lamination direction x and the width direction y. Corners and edges of the laminate 12 are preferably rounded. The corners are portions at which any three adjoining sides of the laminate intersect with one another. The edges are portions at which any two adjoining sides of the laminate intersect with each other. Recesses, projections, or the like, may be provided on a portion or all of the first main surface 12a, the second main surface 12b, the first side surface 12c, the second side surface 12d, the first end surface 12e, and the second end surface 12f. The dimension of the laminate 12 in the longitudinal direction z is not always longer than the dimension of the laminate 12 in the width direction y.

The number of the ceramic layers 14 to be laminated is not specifically limited, and is preferably greater than or equal to about 15 and less than or equal to about 200, for example.

The laminate 12 includes outer layer portions 14a and an inner layer portion 14b. Each of the outer layer portions 14a includes the plurality of ceramic layers 14. The inner layer portion 14b includes one or a plurality of the ceramic layers 14 and the plurality of internal electrode layers 16 respectively provided on top of the one or plurality of ceramic layers 14. The outer layer portions 14a are respectively located at the first main surface 12a and second main surface 12b of the laminate 12. One of the outer layer portions 14a is an aggregate of the plurality of ceramic layers 14 located between the first main surface 12a and the internal electrode layer 16 closest to the first main surface 12a. The other one of the outer layer portions 14a is an aggregate of the plurality of ceramic layers 14 located between the second main surface 12b and the internal electrode layer 16 closest to the second main surface 12b. A region sandwiched by both outer layer portions 14a is the inner layer portion 14b. The thickness of each outer layer portion 14a is preferably greater than or equal to about 50 µm and less than or equal to about 300 µm, for example.

The dimensions of the laminate 12 are not specifically limited. The dimension of the laminate 12 in the longitudinal direction z is preferably greater than or equal to about 0.37 mm and less than or equal to about 5.50 mm, for example. The dimension of the laminate 12 in the width direction y is preferably greater than or equal to about 0.195 mm and less than or equal to about 4.92 mm, for example. The dimension of the laminate 12 in the lamination direction x is preferably greater than or equal to about 0.195 mm and less than or equal to about 2.96 mm, for example.

Each ceramic layer 14 may include, for example, a dielectric material. Examples of the dielectric material include dielectric ceramics with $BaTiO_3$, $CaTiO_3$, $SrTiO_3$, $CaZrO_3$, or the like. When the above-described dielectric material is included as a primary component, dielectric ceramics to which a secondary component, whose content is less than the primary component, such as an Mn compound, an Fe compound, a Cr compound, a Co compound, and an Ni compound, is added based on predetermined characteristics of the laminate 12 may be included.

When piezoelectric ceramics are included in the laminate 12, the multilayer ceramic electronic component functions as and defines a ceramic piezoelectric element. Specific examples of the piezoelectric ceramic material include a lead zirconate titanate (PZT) ceramic material.

When semiconductor ceramics are included in the laminate 12, the multilayer ceramic electronic component functions as and defines a thermistor element. Specific examples of the semiconductor ceramic material include a spinel ceramic material.

When magnetic ceramics are included in the laminate 12, the multilayer ceramic electronic component functions as and defines an inductor element. When the multilayer ceramic electronic component functions as and defines an inductor element, the internal electrode layers 16 are substantially coil-shaped conductors. Specific examples of the magnetic ceramic material include a ferrite ceramic material.

The thickness of each ceramic layer 14 after firing is preferably greater than or equal to about 0.5 µm and less than or equal to about 20.0 µm, for example.

The laminate 12 includes, for example, a plurality of rectangular or substantially rectangular first internal electrode layers 16a and a plurality of rectangular or substantially rectangular second internal electrode layers 16b as the plurality of internal electrode layers 16. The first internal electrode layers 16a and the second internal electrode layers 16b are buried and provided alternately at equal or substantially equal intervals along the lamination direction x of the laminate 12.

Each first internal electrode layer 16a includes a first facing electrode portion 18a and a first extended electrode portion 20a. The first facing electrode portion 18a faces corresponding one or two of the second internal electrode layers 16b. The first extended electrode portion 20a is located at one end of the first internal electrode layer 16a, and extends from the first facing electrode portion 18a to the first end surface 12e of the laminate 12. An end of the first extended electrode portion 20a is extended to the first end surface 12e and is exposed.

Each second internal electrode layer 16b includes a second facing electrode portion 18b and a second extended electrode portion 20b. The second facing electrode portion 18b faces corresponding one or two of the first internal electrode layers 16a. The second extended electrode portion 20b is located at one end of the second internal electrode layer 16b, and extends from the second facing electrode portion 18b to the second end surface 12f of the laminate 12. An end of the second extended electrode portion 20b is extended to the second end surface 12f, and is exposed.

The shape of the first facing electrode portion 18a of each first internal electrode layer 16a and the shape of the second facing electrode portion 18b of each second internal electrode layer 16b are not specifically limited, and are preferably rectangular or substantially rectangular. Corner portions may be rounded or may be chamfered.

The shape of the first extended electrode portion 20a of each first internal electrode layer 16a and the shape of the second extended electrode portion 20b of each second internal electrode layer 16b are not specifically limited, and are preferably rectangular or substantially rectangular. Corner portions may be rounded or may be chamfered.

The width of the first facing electrode portion 18a of each first internal electrode layer 16a and the width of the first extended electrode portion 20a of each first internal electrode layer 16a may be equal or substantially equal to each other or one of the widths may be less than the other. Similarly, the width of the second facing electrode portion 18b of each second internal electrode layer 16b and the width of the second extended electrode portion 20b of each second internal electrode layer 16b may be equal or substantially equal to each other or one of the widths may be less than the other.

The laminate 12 includes side portions (W gaps) 22a. One of the side portions 22a is provided between the first side surface 12c and one ends of the first facing electrode portions 18a and second facing electrode portions 18b in the width direction y. The other one of the side portions 22a is provided between the second side surface 12d and the other ends of the first facing electrode portions 18a and second facing electrode portions 18b in the width direction y. Furthermore, the laminate 12 includes end portions (L gaps) 22b of the laminate 12. One of the end portions 22b is provided between the second end surface 12f and the ends of the first internal electrode layers 16a away from the first extended electrode portions 20a. The other one of the end portions 22b is provided between the first end surface 12e and the ends of the second internal electrode layers 16b away from the second extended electrode portions 20b.

Each internal electrode layer 16 includes an appropriate electrically conductive material that is, for example, a metal such as Ni, Cu, Ag, Pd, and Au or an alloy including at least one of those metals, such as Ag—Pd alloy, for example. Ethyl cellulose or acrylic resin, for example, is preferably included as a resin component that is included as electrically conductive paste for internal electrodes to define the internal electrode layers 16.

The thickness of each internal electrode layer 16 is preferably greater than or equal to about 0.2 µm and less than or equal to about 2.0 µm, for example. The number of the internal electrode layers 16 is preferably greater than or equal to 15 and less than or equal to 200, for example.

The outer electrodes 24 are respectively provided on the first end surface 12e and second end surface 12f of the laminate 12. The outer electrodes 24 include a first outer electrode 24a and a second outer electrode 24b.

The first outer electrode 24a is provided on the surface of the first end surface 12e of the laminate 12, extends from the first end surface 12e, and covers a portion of each of the first main surface 12a, the second main surface 12b, the first side surface 12c, and the second side surface 12d. In this case, the first outer electrode 24a is electrically connected to the first extended electrode portions 20a of the first internal electrode layers 16a. Alternatively, the first outer electrode 24a may be provided only on the first end surface 12e of the laminate 12.

The second outer electrode 24b is provided on the surface of the second end surface 12f of the laminate 12, extends from the second end surface 12f, and covers a portion of each of the first main surface 12a, the second main surface 12b, the first side surface 12c, and the second side surface 12d. In this case, the second outer electrode 24b is electrically connected to the second extended electrode portions 20b of the second internal electrode layers 16b. Alternatively, the second outer electrode 24b may be provided only on the second end surface 12f of the laminate 12.

In the laminate 12, the first facing electrode portion 18a of each first internal electrode layer 16a and the second facing electrode portion 18b of at least any one of the second internal electrode layers 16b face each other via the ceramic layer 14, with the result that capacitance is defined. Therefore, capacitance is defined between the first outer electrode 24a to which the first internal electrode layers 16a are connected and the second outer electrode 24b to which the second internal electrode layers 16b are connected, so the characteristics of the capacitor develops.

Figure 4A:
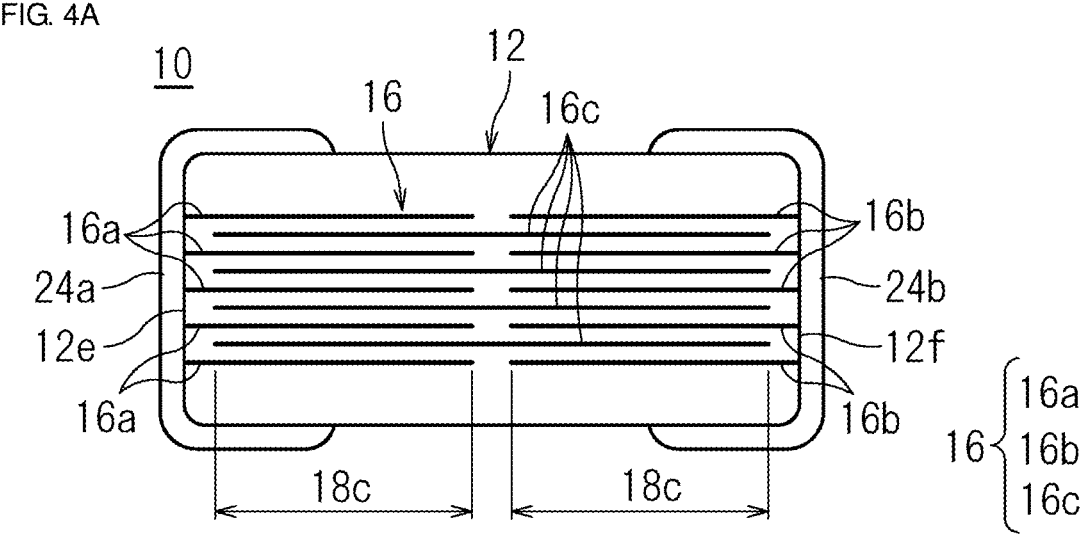
FIG. 4A is a cross-sectional view taken along the line II-II in FIG. 1 and showing a structure that a set of facing electrode portions of internal electrode layers of a multilayer ceramic capacitor according to a preferred embodiment of the present invention is divided into two sets.
Figure 4B:
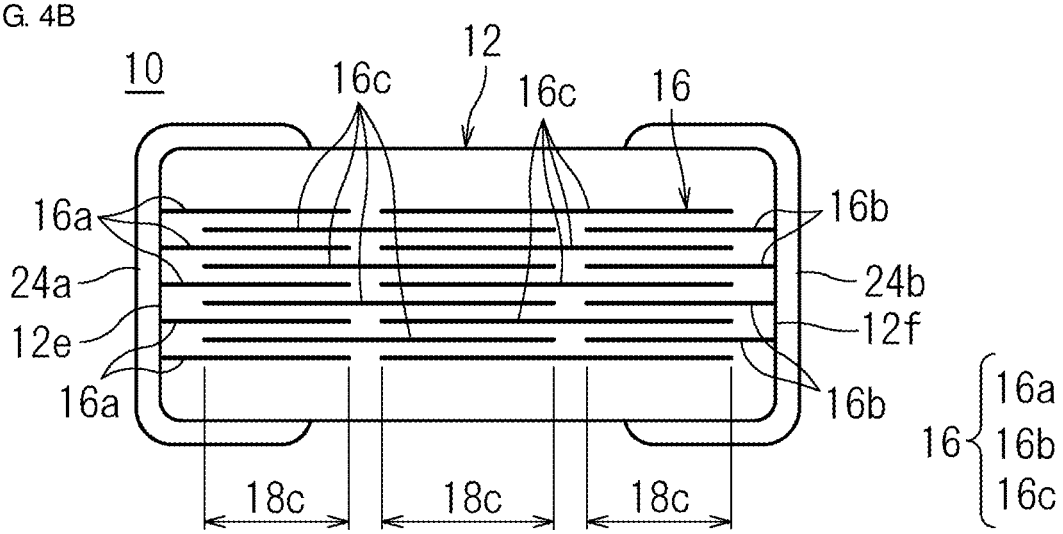
FIG. 4B is a cross-sectional view taken along the line II-II in FIG. 1 and showing a structure that the set of facing electrode portions of the internal electrode layers of a multilayer ceramic capacitor according to a preferred embodiment of the present invention is divided into three sets.
Figure 4C:
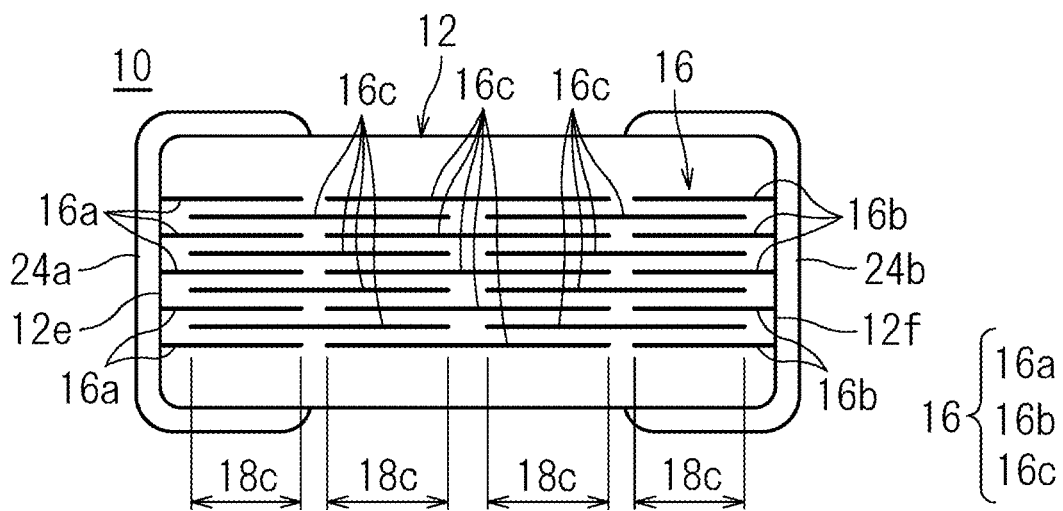
FIG. 4C is a cross-sectional view taken along the line II-II in FIG. 1 and showing a structure that the set of facing electrode portions of the internal electrode layers of a multilayer ceramic capacitor according to a preferred embodiment of the present invention is divided into four sets.

Alternatively, as shown in FIGS. 4A to 4C, floating internal electrode layers 16c that are not extended to the first end surface 12e or the second end surface 12f may be provided as the internal electrode layers 16 in addition to the first internal electrode layers 16a and the second internal electrode layers 16b, and the set of the facing electrode portions may be divided into two sets of facing electrode portions 18c by the floating internal electrode layers 16c. For example, a two-set structure as shown in FIG. 4A, a three-set structure as shown in FIG. 4B, a four-set structure as shown in FIG. 4C, and a four or more set structure are applicable. In this way, with the structure that the set of facing electrode portions 18c is divided into multiple sets, a plurality of capacitor components are defined among the facing internal electrode layers 16a, 16b, 16c, and these capacitor components are connected in series with one another. Therefore, voltage that is applied to each of the capacitor components decreases, so a multilayer ceramic capacitor with a high withstand voltage is provided.

Each outer electrode 24 includes a metal layer 26 at its outermost surface. The metal layer 26 preferably includes, for example, at least a Pd layer 28, an Ni layer 30, and an Sn layer 32 provided from the laminate 12 in this order.

The metal layers 26 include a first metal layer 26a and a second metal layer 26b.

The first metal layer 26a is located at the outermost surface of the first outer electrode 24a. In other words, the first metal layer 26a includes a first Sn layer 32, a first Ni layer 30, and a first Pd layer 28 provided from the outermost surface of the first outer electrode 24a in this order.

The second metal layer 26b is located at the outermost surface of the second outer electrode 24b. In other words, the second metal layer 26b includes a second Sn layer 32, a second Ni layer 30, and a second Pd layer 28 provided from the outermost surface of the second outer electrode 24b in this order.

The first metal layer 26a and the second metal layer 26b are preferably plating layers. In this case, the Pd layers 28 and the Ni layers 30 are able to be thin and uniform. This contributes to downsizing of an electronic component and cost reduction resulting from usage of a necessary minimum amount of Pd.

On the other hand, the Pd layers 28 may be sintered metal layers including glass.

When the Pd layers 28 are plating layers, the thickness of each Pd layer 28 is preferably greater than or equal to about 0.04 µm, for example. More specifically, the thickness of the first Pd layer 28a located on the first end surface 12e at the center portion of the first Pd layer 28a in the lamination direction x and the thickness of the second Pd layer 28b located on the second end surface 12f at the center portion of the second Pd layer 28b in the lamination direction x are preferably greater than or equal to about 0.04 µm, for example.

When the first Pd layer 28a and the second Pd layer 28b are provided on the first main surface 12a, the second main surface 12b, the first side surface 12c, and the second side surface 12d, the thickness of the first Pd layer 28a located on each of the first main surface 12a, the second main surface 12b, the first side surface 12c, and the second side surface 12d at the center portion of the first Pd layer 28a in the longitudinal direction z and the thickness of the second Pd layer 28b located on each of the first main surface 12a, the second main surface 12b, the first side surface 12c, and the second side surface 12d at the center portion of the second Pd layer 28b in the longitudinal direction z are preferably greater than or equal to about 0.04 µm, for example.

When the Pd layers 28 are sintered metal layers including glass, the thickness of the first Pd layer 28a located on the first end surface 12e at the center portion of the first Pd layer 28a in the lamination direction x and the thickness of the second Pd layer 28b located on the second end surface 12f at the center portion of the second Pd layer 28b in the lamination direction x are preferably greater than or equal to about 15 µm and less than or equal to about 160 µm, for example.

When the first Pd layer 28a and the second Pd layer 28b are provided on the first main surface 12a, the second main surface 12b, the first side surface 12c, and the second side surface 12d, the thickness of the first Pd layer 28a located on each of the first main surface 12a, the second main surface 12b, the first side surface 12c, and the second side surface 12d at the center portion of the first Pd layer 28a in the longitudinal direction z and the thickness of the second Pd layer 28b located on each of the first main surface 12a, the second main surface 12b, the first side surface 12c, and the second side surface 12d at the center portion of the second Pd layer 28b in the longitudinal direction z are preferably greater than or equal to about 5 µm and less than or equal to about 40 µm, for example.

The thickness of each Ni layer 30 is preferably greater than or equal to about 0.6 µm, for example. Thus, a sufficient amount of Ni—Sn intermetallic compound that is produced when solder is melted is provided on or above each Pd layer 28. This maintains the function of the barrier layers that protect the outer electrodes 24 against solder leaching even in an about 200 degrees C. high-temperature environment. More specifically, the thickness of the first Ni layer 30a located on the first end surface 12e at the center portion of the first Ni layer 30a in the lamination direction x and the thickness of the second Ni layer 30b located on the second end surface 12f at the center portion of the second Ni layer 30b in the lamination direction x are preferably greater than or equal to about 0.6 µm, for example.

When the first Ni layer 30a and the second Ni layer 30b are provided on the first main surface 12a, the second main surface 12b, the first side surface 12c, and the second side surface 12d, the thickness of the first Ni layer 30a located on each of the first main surface 12a, the second main surface 12b, the first side surface 12c, and the second side surface 12d at the center portion of the first Ni layer 30a in the longitudinal direction z and the thickness of the second Ni layer 30b located on each of the first main surface 12a, the second main surface 12b, the first side surface 12c, and the second side surface 12d at the center portion of the second Ni layer 30b in the longitudinal direction z are preferably greater than or equal to about 0.6 µm, for example.

When the thickness of each Ni layer 30 is less than about 0.6 µm, a formation of an Ni—Sn compound layer on or above each Pd layer 28 is insufficient. As a result, Sn in solder erodes Pd in an approximately 200 degrees C. high-temperature environment, and base electrode erosion occurs in a corresponding one of base electrode layers 34 (described later) provided under the Pd layer 28.

The thickness of each Ni layer 30 is not specifically limited. However, from the viewpoint of size reduction of the multilayer ceramic capacitor 10, the thickness of each Ni layer 30 is preferably less than or equal to about 10 µm, for example.

The thickness of each Sn layer 32 is not specifically limited. For example, the thickness of the first Sn layer 32a located on the first end surface 12e at the center portion of the first Sn layer 32a in the lamination direction x and the thickness of the second Sn layer 32b located on the second end surface 12f at the center portion of the second Sn layer 32b in the lamination direction x are preferably greater than or equal to about 2 µm and less than or equal to about 10 µm, for example.

When the first Sn layer 32a and the second Sn layer 32b are provided on the first main surface 12a, the second main surface 12b, the first side surface 12c, and the second side surface 12d, the thickness of the first Sn layer 32a located on each of the first main surface 12a, the second main surface 12b, the first side surface 12c, and the second side surface 12d at the center portion of the first Sn layer 32a in the longitudinal direction z and the thickness of the second Sn layer 32b located on each of the first main surface 12a, the second main surface 12b, the first side surface 12c, and the second side surface 12d at the center portion of the second Sn layer 32b in the longitudinal direction z are preferably greater than or equal to about 2 µm and less than or equal to about 10 µm, for example.

Each outer electrode 24 further includes the base electrode layer 34. The base electrode layer 34 is located on the laminate 12, directly connected to the corresponding internal electrode layers 16, and is provided immediately below the metal layer 26. In other words, each outer electrode 24 further includes the base electrode layer 34. The base electrode layer 34 is connected to the corresponding internal electrode layers 16, contacts with the laminate 12, and is located between the laminate 12 and the metal layer 26. Thus, the reliability of electrical connection from the internal electrode layers 16 to the metal layers 26 (Pd, Ni, and Sn plating layers) is enhanced, so the stability of characteristics of the multilayer ceramic capacitor 10 as an electronic component is defined.

The base electrode layers 34 do not always need to be provided on the laminate 12.

The base electrode layers 34 include a first base electrode layer 34a and a second base electrode layer 34b. The first outer electrode 24a includes the first base electrode layer 34a. The second outer electrode 24b includes the second base electrode layer 34b.

The first base electrode layer 34a is provided on the surface of the first end surface 12e of the laminate 12. The first base electrode layer 34a may extend from the first end surface 12e and cover a portion of each of the first main surface 12a, the second main surface 12b, the first side surface 12c, and the second side surface 12d.

The second base electrode layer 34b is provided on the surface of the second end surface 12f of the laminate 12. The second base electrode layer 34b may extend from the second end surface 12f and cover a portion of each of the first main surface 12a, the second main surface 12b, the first side surface 12c, and the second side surface 12d.

When the first base electrode layer 34a is provided, the first metal layer 26a covers the first base electrode layer 34a. Similarly, when the second base electrode layer 34b is provided, the second metal layer 26b covers the second base electrode layer 34b.

Each base electrode layer 34 includes at least one selected from among a baked layer, an electrically conductive resin layer, a thin film layer, and other layers.

First, the case where each base electrode layer 34 is a baked layer will be described.

Each base electrode layer 34 includes an electrically conductive metal and a glass component. Examples of the electrically conductive metal for the base electrode layers 34 include at least one selected from among Cu, Ni, Ag, Pd, Ag—Pd alloy, Au, and the like. Examples of the glass component of the base electrode layers 34 include at least one selected from among B, Si, Ba, Mg, Al, Li, and the like. Each base electrode layer 34 may include multiple layers. The base electrode layers 34 are formed by applying electrically conductive paste including glass and metal onto the laminate 12 and then baking the paste. The base electrode layers 34 may be fired at the same time with the ceramic layers 14 and the internal electrode layers 16 or may be baked after the ceramic layers 14 and the internal electrode layers 16 are fired.

The thickness of the first base electrode layer 34a located on the first end surface 12e at the center portion of the first base electrode layer 34a in the lamination direction x and the thickness of the second base electrode layer 34b located on the second end surface 12f at the center portion of the second base electrode layer 34b in the lamination direction x are preferably greater than or equal to about 15 µm and less than or equal to about 160 µm, for example.

When the first base electrode layer 34a and the second base electrode layer 34b are provided on the surfaces of the first main surface 12a, the second main surface 12b, the first side surface 12c, and the second side surface 12d, the thickness of the first base electrode layer 34a located on each of the surfaces of the first main surface 12a, the second main surface 12b, the first side surface 12c, and the second side surface 12d at the center portion of the first base electrode layer 34a in the longitudinal direction z and the thickness of the second base electrode layer 34b located on each of the surfaces of the first main surface 12a, the second main surface 12b, the first side surface 12c, and the second side surface 12d at the center portion of the second base electrode layer 34b in the longitudinal direction z are preferably greater than or equal to about 5 µm and less than or equal to about 40 µm, for example.

Next, the case where each base electrode layer 34 is an electrically conductive resin layer will be described.

The electrically conductive resin layer may be provided on a baked layer to cover the baked layer or may be directly provided on the laminate 12.

The electrically conductive resin layer includes a thermosetting resin and a metal.

Since the electrically conductive resin layer includes a thermosetting resin, the electrically conductive resin layer is more flexible than, for example, a plating film or an electrically conductive layer defined by a fired product of electrically conductive paste. Therefore, even when a physical shock or a shock due to heat cycle acts on the multilayer ceramic capacitor (multilayer ceramic electronic component), each electrically conductive resin layer functions as and defines a shock-absorbing layer, with the result that a formation of cracks in the multilayer ceramic capacitor (multilayer ceramic electronic component) is prevented.

Examples of the metal included in the electrically conductive resin layer include Ag, Cu, and alloys of them. Metal powder of which the particles are coated with Ag may be included. When metal powder of which the particles is coated with Ag is included, Cu or Ni is preferably included as the metal powder. Cu to which antioxidation treatment is applied may be included.

Ag, which is an electrically conductive metal powder, is preferably included as the metal in the electrically conductive resin layer since it is suitable for an electrode material. In particular, Ag has the lowest specific resistance among metals, Ag is difficult to oxidize, and Ag provides high weather resistance because Ag is a noble metal. The metal coated with Ag is preferably the metal included in the electrically conductive resin layer since the metal of a base material is reduced in cost while the above-described characteristics of Ag are maintained.

The content of the metal included in the electrically conductive resin layer is preferably higher than or equal to about 35 percent by volume and lower than or equal to about 75 percent by volume with respect to the total volume of the electrically conductive resin layer.

The shape of the metal (electrically conductive filler) included in the electrically conductive resin layer is not specifically limited. The electrically conductive filler may be spherical or substantially spherical particles, oblate or substantially oblate particles, or other shaped particles. A mixture of spherical or substantially spherical metal powder and oblate or substantially oblate metal powder is preferably included as the metal in the electrically conductive resin layer.

The average particle diameter of the metal included in the electrically conductive resin layer is not specifically limited. The average particle diameter of the electrically conductive filler may be, for example, greater than or equal to about 0.3 µm and less than or equal to about 10 µm, for example.

The metal included in the electrically conductive resin layer mainly imparts a current-carrying property to the electrically conductive resin layer. Specifically, when particles in the electrically conductive filler contact with each other, a current-carrying path is defined inside the electrically conductive resin layer.

Examples of the resin in the electrically conductive resin layer include known various thermosetting resins, such as epoxy resin, phenolic resin, urethane resin, silicone resin, and polyimide resin. Of these resins, epoxy resin with excellent heat resistance, moisture resistance, adhesion property, and the like, is one of the most appropriate resins.

The electrically conductive resin layer preferably includes a curing agent together with a thermosetting resin. When epoxy resin is included as a base resin, examples of a curing agent for epoxy resin include known various compounds, such as phenol compounds, amine compounds, acid anhydride compounds, and imidazole compounds.

The thickness of the electrically conductive resin layer of the first base electrode layer 34a located on the first end surface 12e at the center portion of the first base electrode layer 34a in the lamination direction x and the thickness of the electrically conductive resin layer of the second base electrode layer 34b located on the second end surface 12f at the center portion of the second base electrode layer 34b in the lamination direction x are preferably, for example, greater than or equal to about 10 µm and less than or equal to about 120 µm, for example.

When the base electrode layers 34 are provided on the surfaces of the first main surface 12a, the second main surface 12b, the first side surface 12c, and the second side surface 12d, the thickness of the electrically conductive resin layer of the first base electrode layer 34a located on each of the surfaces of the first main surface 12a, the second main surface 12b, the first side surface 12c, and the second side surface 12d at the center portion of the first base electrode layer 34a in the longitudinal direction z and the thickness of the electrically conductive resin layer of the second base electrode layer 34b located on each of the surfaces of the first main surface 12a, the second main surface 12b, the first side surface 12c, and the second side surface 12d at the center portion of the second base electrode layer 34b in the longitudinal direction z are preferably greater than or equal to about 5 µm and less than or equal to about 40 µm, for example.

The dimension of the multilayer ceramic capacitor 10, including the laminate 12, the first outer electrode 24a, and the second outer electrode 24b, in the longitudinal direction z is defined as L dimension, the dimension of the multilayer ceramic capacitor 10, including the laminate 12, the first outer electrode 24a, and the second outer electrode 24b, in the lamination direction x is defined as T dimension, and the dimension of the multilayer ceramic capacitor 10, including the laminate 12, the first outer electrode 24a, and the second outer electrode 24b, in the width direction y is defined as W dimension.

The dimensions of the multilayer ceramic capacitor 10 are preferably as follows. The L dimension in the longitudinal direction z is greater than or equal to about 0.4 mm and less than or equal to about 6.1 mm, for example. The W dimension in the width direction y is greater than or equal to about 0.2 mm and less than or equal to about 5.4 mm, for example. The T dimension in the lamination direction x is greater than or equal to about 0.2 mm and less than or equal to about 3.0 mm, for example.

When each base electrode layer 34 is a thin film layer, the thin film layer is formed by a thin film formation method, such as sputtering and vapor deposition. The thin film layer is a layer of deposited metal particles and has a thickness of less than or equal to about 1 μm, for example.

In the multilayer ceramic capacitor 10 shown in FIG. 1, each outer electrode 24 includes the metal layer 26 at its outermost surface, and the metal layer 26 includes at least the Pd layer 28, the Ni layer 30, and the Sn layer 32 laminated from the laminate 12 in this order. Thus, Sn that has reacted with Ni when solder is melted contacts with the Pd layer, and the Pd layer 28 functions as and defines a remarkably strong barrier layer against an Ni—Sn compound. This reduces or prevents solder leaching. More specifically, since the metal layer 26 located at the outermost surface of each outer electrode 24 includes the Pd layer 28, the Ni layer 30, and the Sn layer 32 laminated from a portion adjacent to or in a vicinity of the laminate 12 toward the surface in this order, when the temperature becomes higher than or equal to a solder melting point, Sn initially reacts with Ni to produce an Ni—Sn intermetallic compound and the compound contacts with the Pd layer 28. Ordinarily, the Pd layer 28 does not work as a strong barrier layer against Sn in a high-temperature environment; however, the Pd layer 28 provides a strong barrier layer against an Ni—Sn alloy that is an intermetallic compound. When the multilayer ceramic capacitor 10 is exposed to high temperature for a long period of time, Ni does not disperse into solder and tends to remain on the Pd surface, so the Pd layer 28 and the Ni—Sn intermetallic compound are maintained over time as barrier layers against solder. With the above features, with the multilayer ceramic capacitor 10 shown in FIG. 1, even in an operational environment in which the temperature exceeds about 175 degrees C. or about 200 degrees C., short-time solder leaching and solder leaching that occurs over time are reduced or prevented. As a result, a mechanical and electrical joint failure is prevented.

In the multilayer ceramic capacitor 10 shown in FIG. 1, each outer electrode 24 is connected to the internal electrode layers 16 and contacts with the laminate 12, and the base electrode layer 34 is located between the laminate 12 and the metal layer 26. Therefore, the reliability of electrical connection from the internal electrode layers 16 to each metal layer 26 (Pd, Ni, and Sn plating layers) is high, with the result that the stability of characteristics of the multilayer ceramic capacitor 10 as an electronic component is obtained.

In the multilayer ceramic capacitor 10 shown in FIG. 1, when each metal layer 26 is a plating layer, the Pd layer 28 and the Ni layer 30 are able to be thin and uniform. This contributes to downsizing of an electronic component and cost reduction resulting from usage of a necessary minimum amount of Pd.

In the multilayer ceramic capacitor 10 shown in FIG. 1, when the thickness of each Ni layer is greater than or equal to about 0.6 μm, for example, a sufficient amount of Ni—Sn intermetallic compound that is produced when solder is melted is provided on or above each Pd layer 28. Accordingly the function of the barrier layers that protect the outer electrodes 24 against solder leaching is maintained, even in an about 200 degrees C. high-temperature environment.

2. Manufacturing Method for Multilayer Ceramic Capacitor

Next, a manufacturing method for a multilayer ceramic capacitor according to a preferred embodiment of the present invention will be described.

First, ceramic paste including ceramic powder is applied in a substantially sheet shape by, for example, screen printing, or the like, and is dried, with the result that a ceramic green sheet is prepared.

Subsequently, electrically conductive paste that defines internal electrodes is applied onto the ceramic green sheet in a predetermined pattern by, for example, screen printing, gravure printing, or the like. As a result, the ceramic green sheet on which an electrically conductive pattern that defines internal electrodes is formed and a ceramic green sheet on which no electrically conductive pattern that defines internal electrodes is formed are prepared. The ceramic paste and the electrically conductive paste that forms internal electrodes include, for example, a binder or a solvent. A known organic binder or a known organic solvent may be included as the binder or the solvent.

Subsequently, a predetermined number of ceramic green sheets for an outer layer, on which no electrically conductive pattern that defines internal electrodes is formed, are laminated, the ceramic green sheets on which the electrically conductive pattern that defines the internal electrodes is formed are sequentially laminated on the ceramic green sheets for the outer layer, and, furthermore, a predetermined number of ceramic green sheets on which no electrically conductive pattern that defines internal electrodes is formed are further laminated. Thus, a laminate sheet is prepared.

Then, the laminate sheets are pressure-bonded to one another in the lamination direction with an isostatic press, or other devices, for example. Thus, a multilayer block is prepared.

After that, the multilayer block is cut into a predetermined geometry, and a raw multilayer chip is obtained. At this time, the corners and edges of the laminate may be rounded by, for example, barreling the raw multilayer chip.

Subsequently, the cut raw multilayer chip is fired. As a result, the laminate in which the first internal electrode layers and the second internal electrode layers are provided in the laminate, the first internal electrode layers are extended to the first end surface, and the second internal electrode layers are extended to the second end surface is produced. Although the firing temperature of the raw multilayer chip depends on the material of the ceramics and the material of the electrically conductive paste that forms internal electrodes, the firing temperature is preferably higher than or equal to about 900 degrees C. and lower than or equal to about 1300 degrees C., for example.

Next, the base electrode layers 34 are formed. First, electrically conductive paste for outer electrodes is applied to both end surfaces of the fired multilayer chip, and baked. Thus, the first base electrode layer 34a of the first outer electrode 24a and the second base electrode layer 34b of the second outer electrode 24b are formed. The baking temperature is preferably higher than or equal to 700 degrees C. and lower than or equal to about 900 degrees C., for example.

After that, the metal layer 26 is formed on the surface of each base electrode layer 34 that is the baked layer. Each metal layer 26 includes the Pd layer 28, the Ni layer 30, and the Sn layer 32 laminated in this order. The Pd layer 28 may be formed by plating through electrolytic plating or electroless plating or may be formed by a sintered metal that is formed by applying electrically conductive paste including glass and Pd metal and baking the paste. The Ni layer 30 and the Sn layer 32 may be formed by electrolytic plating or electroless plating. The thickness of each of the metal layers is adjusted by controlling plating conditions.

As described above, the multilayer ceramic capacitor 10 shown in FIG. 1 is manufactured.

3. Mounting Structure for Multilayer Ceramic Electronic Component

Figure 5:
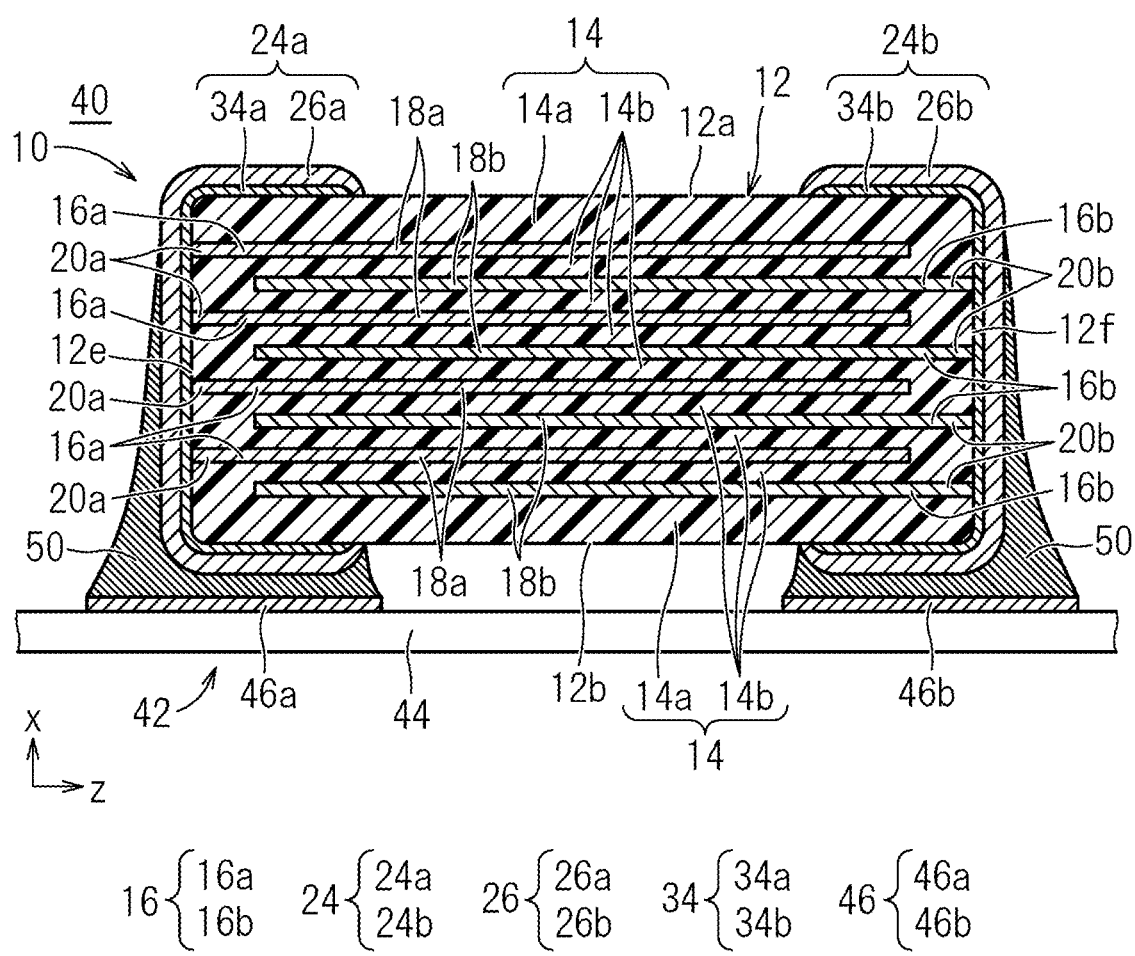
FIG. 5 is a cross-sectional view showing one example of a mounting structure for a multilayer ceramic capacitor according to a preferred embodiment of the present invention.

Next, a mounting structure for a multilayer ceramic electronic component according to a preferred embodiment of the present invention will be described with reference to FIG. 5. Description is provided below with respect to an example in which the multilayer ceramic capacitor 10 shown in FIG. 1 is mounted on a circuit board 42. FIG. 5 is a cross-sectional view showing an example of the mounting structure for a multilayer ceramic electronic component according to the preferred embodiment of the present invention. The multilayer ceramic capacitor 10 shown in FIG. 5 includes the same or a similar structure as the multilayer ceramic capacitor 10 shown in FIG. 1 to FIG. 4C.

The mounting structure 40 for a multilayer ceramic electronic component according to the preferred embodiment of the present invention includes the multilayer ceramic capacitor 10 and the circuit board 42. The multilayer ceramic capacitor 10 functions as and defines the multilayer ceramic electronic component. The circuit board 42 is a circuit board on which the multilayer ceramic capacitor 10 is mounted.

The circuit board 42 is a circuit board in which land electrodes 46 are bonded to a main surface of a core material 44 of the circuit board 42. The monolayer core material 44 may be formed or the multilayer core materials 44 may be formed. When the multilayer core materials 44 are formed, wiring may be designed with the land electrodes 46 formed on each of the surfaces of the core materials 44 and are electrically connected to land electrodes (not shown) on another one of the layers through via wires (not shown), or the like.

Each core material 44 is a substrate including a material provided by impregnating a base material, which is a mixture of, for example, glass cloth and glass nonwoven fabric, with epoxy resin or polyimide resin or a ceramic substrate that is manufactured by baking a sheet obtained by mixing ceramics with glass. The thickness of each core material 44 is not specifically limited, and is preferably greater than or equal to about 200 μm and less than or equal to about 800 μm, for example.

The land electrodes 46 are bonded to one side or both sides of each core material 44 of the circuit board 42. The outer electrodes 24 of the multilayer ceramic capacitor 10 are mounted on the land electrodes 46 by solder. The land electrodes 46 include a first land electrode 46a and a second land electrode 46b. The material of each land electrode 46 is not specifically limited, and is preferably, for example, defined by a metal, such as Cu, Au, Pd, and Pt, or an alloy of one or more of these metals. The thickness of each land electrode 46 is preferably greater than or equal to about 20 μm and less than or equal to about 200 μm, for example.

A lead frame including Cu or Al may be implemented as wires, and the multilayer ceramic capacitor may be mounted by solder that bridges between different lead frames.

The first outer electrode 24a contacts with the first land electrode 46a on the circuit board 42 and the second outer electrode 24b contacts with the second land electrode 46b on the circuit board 42. The first outer electrode 24a is bonded to the first land electrode 46a in a state where the first outer electrode 24a is electrically connected to the first land electrode 46a by a solder portion 50. Similarly, the second outer electrode 24b is bonded to the second land electrode 46b in a state where the second outer electrode 24b is electrically connected to the second land electrode 46b by a solder portion 50.

The solder portions 50 include lead-free solder. The lead-free solder preferably includes, for example, a composition that is adjusted within the range in which Sn is greater than or equal to about 96.3% and less than or equal to about 99.0%, Ag is greater than or equal to about 0% and less than or equal to about 3%, and Cu is greater than or equal to about 0.5% and less than or equal to about 0.7%, and more preferably includes a composition that Sn is about 96.5%, Ag is about 3%, and Cu is about 0.5%.

For example, in a high-temperature environment like an about 175 degrees C. environment or an about 200 degrees C. environment, the Ni layer 30 and the Sn layer 32 preferably form a compound.

With the mounting structure 40 for a multilayer ceramic electronic component as described herein and as shown in FIG. 5, the effect of reducing or preventing solder leaching of the base electrode layers 34 is obtained.

More specifically, each metal layer 26 located at the outermost surface of a corresponding one of the outer electrodes 24 includes the Pd layer 28, the Ni layer 30, and the Sn layer 32 laminated from a portion adjacent to or in a vicinity of the laminate 12 toward the surface in this order. Therefore, when the temperature is higher than or equal to the solder melting point, first, Sn reacts with Ni to produce an Ni—Sn intermetallic compound, and the compound contacts with the Pd layer 28. Ordinarily, the Pd layer 28 does not work as a strong barrier layer against Sn in a high-temperature environment. However, the Pd layer 28 provides a strong barrier layer against an Ni—Sn alloy that is an intermetallic compound. When the multilayer ceramic capacitor 10 is exposed to high temperature for a long period of time, Ni does not disperse into solder and tends to remain on the Pd surface, so the Pd layer and the Ni—Sn intermetallic compound are maintained over time as excellent barrier layers against solder.

With the above features, with the mounting structure 40 for a multilayer ceramic electronic component, shown in FIG. 5, for example, even in an operational environment in which the temperature exceeds about 175 degrees C. or about 200 degrees C., short-time solder leaching and solder leaching that occurs over time are reduced or prevented. As a result, a mechanical and electrical joint failure is prevented.

4. Experimental Examples

Next, to verify the advantageous effects of the above-described multilayer ceramic electronic component and its mounting structure according to preferred embodiments of the present invention, multilayer ceramic capacitors were manufactured as multilayer ceramic electronic components based on the manufacturing method of the preferred embodiment of the present invention described above, samples subjected to a high temperature loading test were checked for occurrence of a void in the cross section of each laminate, and samples subjected to a lateral adhesion strength test were checked for penetration of a fracture surface to the inside of the outer electrode.

(1) Examples and Comparative Examples

For Example 1 to Example 4, multilayer ceramic capacitors with the specifications described below were prepared in accordance with the above-described manufacturing method for a multilayer ceramic electronic component.

In Example 1 to Example 4, the Pd layers were formed by electrolytic plating, and the Ni layers and the Sn layers were also formed by electrolytic plating. The thickness of each of the Pd layer, Ni layer, and Sn layer that are the components of each metal layer was adjusted by controlling plating conditions. The thickness of each Ni layer was controlled to about 0.4 μm for the samples of Example 1, about 0.6 μm for the samples of Example 2, about 0.8 μm for the samples of Example 3, and about 1.0 μm for the samples of Example 4. The number of samples of each of Example 1 to Example 4 was 10.

On the other hand, for Comparative Example 1 and Comparative Example 2, multilayer ceramic capacitors with the specifications described later were prepared in accordance with the existing manufacturing method for a multilayer ceramic electronic component.

In Comparative Example 1 and Comparative Example 2, the Pd layers were formed by electrolytic plating, and the Ni layers and the Sn layers were also formed by electrolytic plating. The thickness of each of the Pd layer, Ni layer, and Sn layer that are the components of each metal layer was adjusted by controlling plating conditions. For Comparative Example 1, no Ni layer was formed. The thickness of each Ni layer was controlled to about 0.3 μm for the samples of Comparative Example 2. The number of samples of each of Comparative Example 1 and Comparative Example 2 was 10.

The specifications of each of the multilayer ceramic capacitors that are samples used for Examples and Comparative Examples are as follows:

Dimensions (design values) of each multilayer ceramic capacitor: Length×Width×Height=about 1.0 mm×about 0.5 mm×about 0.5 mm Capacitance: about 0.01 μF Rated voltage: about 50 V Material of ceramic layers: $BaTiO_3$ Structure of each outer electrode: a base electrode layer and a metal layer Thickness of each base electrode layer:
  Thickness of each of the base electrode layer located on the first end surface at the center portion in the lamination direction and the base electrode layer located on the second end surface at the center portion in the lamination direction when viewed in the cross section of the laminate taken at ½ W location: about 50 μm
  Thickness of each of the base electrode layer located on each of the first main surface and the second main surface at the center portion in the longitudinal direction when viewed in the cross section of the laminate taken at ½ W location and, thickness of each of the base electrode layer located on each of the first side surface and the second side surface at the center portion in the longitudinal direction when viewed in the cross section of the laminate taken at ½T location: about 14 μm Thickness of each metal layer: see Table 1 to Table 3.

The specifications of each circuit board used in experiments and the mounting structure for each multilayer ceramic capacitor on the circuit board were as follows.

Land electrodes that conform to JIS were formed on a high temperature-resistant BN-LX substrate. For pattern electrodes, Au plating was formed on Cu foil.

Each of the multilayer ceramic capacitors that are the samples and the pattern electrodes on the circuit board were connected by solder. The solder was SAC 305 (Sn-3.0Ag-0.5Cu) that is lead-free solder made by Senju Metal Industry, Co., Ltd. The thickness of a metal mask for printing solder was about 150 μm. The peak temperature at the time of mounting each sample on the circuit board by reflowing was about 250 degrees C.

(2) Method of Measuring Thickness of Metal Layer

Ten samples of each of Examples and Comparative Examples, on which the Pd layers, the Ni layers, and the Sn layers had just been formed, were taken out, and the film thickness of each layer was measured by a fluorescent X-ray thickness meter. A location to be measured was within a spot size 0100 μm from the center portion of each outer electrode surface.

Table 1 shows the measured results of the thickness of the Pd layer in each of Examples and Comparative Examples. Tables 2 shows the measured results of the thickness of the Ni layer in each of Examples and Comparative Examples. Table 3 shows the measured results of the thickness of the Sn layer in each of Examples and Comparative Examples. The measured results of the thickness of the Pd layer, shown in Table 1, are common to Example 1 to Example 4, Comparative Example 1, and Comparative Example 2.

TABLE 1

| | | THICKNESS OF Pd LAYER COMMON TO COMPARATIVE EXAMPLES AND EXAMPLES (μm) |
|---|---|---|
| SAMPLE NUMBER | 1 | 0.624 |
| | 2 | 0.573 |
| | 3 | 0.628 |
| | 4 | 0.540 |
| | 5 | 0.625 |
| | 6 | 0.541 |
| | 7 | 0.546 |
| | 8 | 0.545 |
| | 9 | 0.552 |
| | 10 | 0.582 |
| AVERAGE | | 0.576 |

TABLE 2

| | | THICKNESS OF Ni LAYER | | | | | |
|---|---|---|---|---|---|---|---|
| | | EXAMPLE 1 INTENDED Ni LAYER THICKNESS: 0.4 μm (μm) | EXAMPLE 2 INTENDED Ni LAYER THICKNESS: 0.6 μm (μm) | EXAMPLE 3 INTENDED Ni LAYER THICKNESS: 0.8 μm (μm) | EXAMPLE 4 INTENDED Ni LAYER THICKNESS: 1.0 μm (μm) | COMPARATIVE EXAMPLE 1 (NO Ni LAYER) | COMPARATIVE EXAMPLE 2 INTENDED Ni LAYER THICKNESS: 0.3 μm (μm) |
| SAMPLE NUMBER | 1 | 0.385 | 0.635 | 0.733 | 0.905 | | 0.446 |
| | 2 | 0.389 | 0.609 | 0.666 | 1.081 | | 0.181 |
| | 3 | 0.362 | 0.618 | 0.846 | 1.130 | | 0.339 |

TABLE 2-continued

THICKNESS OF Ni LAYER

| | | EXAMPLE 1 INTENDED Ni LAYER THICKNESS: 0.4 μm (μm) | EXAMPLE 2 INTENDED Ni LAYER THICKNESS: 0.6 μm (μm) | EXAMPLE 3 INTENDED Ni LAYER THICKNESS: 0.8 μm (μm) | EXAMPLE 4 INTENDED Ni LAYER THICKNESS: 1.0 μm (μm) | COMPARATIVE EXAMPLE 1 (NO Ni LAYER) | COMPARATIVE EXAMPLE 2 INTENDED Ni LAYER THICKNESS: 0.3 μm (μm) |
|---|---|---|---|---|---|---|---|
| | 4 | 0.317 | 0.723 | 0.805 | 0.978 | | 0.232 |
| | 5 | 0.267 | 0.661 | 0.931 | 1.038 | | 0.426 |
| | 6 | 0.436 | 0.727 | 0.744 | 1.005 | | 0.310 |
| | 7 | 0.515 | 0.464 | 0.904 | 1.111 | | 0.226 |
| | 8 | 0.262 | 0.519 | 0.726 | 0.945 | | 0.228 |
| | 9 | 0.289 | 0.586 | 0.745 | 0.933 | | 0.173 |
| | 10 | 0.529 | 0.704 | 0.782 | 0.885 | | 0.295 |
| AVERAGE | | 0.38 | 0.62 | 0.79 | 1.00 | — | 0.29 |

TABLE 3

THICKNESS OF Sn LAYER

| | | EXAMPLE 1 (μm) | EXAMPLE 2 (μm) | EXAMPLE 3 (μm) | EXAMPLE 4 (μm) | COMPARATIVE EXAMPLE 1 (μm) | COMPARATIVE EXAMPLE 2 (μm) |
|---|---|---|---|---|---|---|---|
| SAMPLE | 1 | 4.226 | 4.216 | 3.690 | 4.291 | 4.125 | 4.177 |
| NUMBER | 2 | 4.180 | 4.348 | 4.197 | 4.190 | 4.365 | 4.131 |
| | 3 | 4.620 | 3.811 | 4.004 | 4.150 | 4.183 | 4.147 |
| | 4 | 4.238 | 4.150 | 4.102 | 3.953 | 4.009 | 4.334 |
| | 5 | 4.697 | 4.269 | 4.051 | 4.266 | 3.996 | 4.069 |
| | 6 | 4.163 | 3.863 | 3.681 | 4.498 | 3.950 | 3.823 |
| | 7 | 4.629 | 3.853 | 3.922 | 4.122 | 4.279 | 3.874 |
| | 8 | 4.294 | 3.814 | 3.977 | 4.416 | 4.117 | 4.315 |
| | 9 | 4.205 | 4.115 | 3.629 | 4.427 | 4.049 | 4.208 |
| | 10 | 4.119 | 4.025 | 3.619 | 4.077 | 4.211 | 3.989 |
| AVERAGE | | 4.34 | 4.05 | 3.89 | 4.24 | 4.13 | 4.11 |

(3) Method of Evaluating Characteristics (a) Evaluation Method 1

After the sample multilayer ceramic capacitors of Examples and Comparative Examples with the above-described specifications in a state of being mounted on the circuit boards were left standing at about 200 degrees C. for about 1000 hours (hereinafter, referred to as high temperature exposure test), the sample multilayer ceramic capacitors were cross-sectioned up to the ½ W location or the ½T location, the cross section was parallel or substantially parallel to the main surfaces or side surfaces of the multilayer ceramic capacitor, and whether solder eroded at least any one of the base electrode layers and a void was formed between the base electrode layer and the solder and metal layer was checked. The number of cases where solder eroded at least any one of the base electrode layers and a void was formed between the base electrode layer and the solder and metal layer was counted. The experimental results through Evaluation Method 1 are shown in Table 4.

(b) Evaluation Method 2

The sample multilayer ceramic capacitors of Examples and Comparative Examples with the above-described specifications in a state of being mounted on the circuit boards were subjected to the lateral adhesion strength test before high temperature exposure test and after high temperature exposure test, the breakdown limits of the samples were measured, and then whether a fracture surface reached the inside of the base electrode layer was checked. "Reached" represents that a fracture surface reached the inside of the base electrode layer. "Not reached" represents that the fracture surface did not reach the inside of the base electrode layer. Table 5 shows the results of the average (ave), maximum (max), minimum (min), and standard deviation (σ) of breakdown limits and the checked results of the fracture surface for the 10 samples of each of Examples through Evaluation Method 2 Table 6 shows the results of the average (ave), maximum (max), minimum (min), and standard deviation (σ) of breakdown limits and the checked results of the fracture surface for the 10 samples of each of Comparative Examples through Evaluation Method 2.

TABLE 4

| | EXAMPLE 1 (NUMBER) | EXAMPLE 2 (NUMBER) | EXAMPLE 3 (NUMBER) | EXAMPLE 4 (NUMBER) | COMPARATIVE EXAMPLE 1 (NUMBER) | COMPARATIVE EXAMPLE 2 (NUMBER) |
|---|---|---|---|---|---|---|
| NUMBER OF SAMPLES SOLDER ERODED TO BASE ELECTRODE LAYER | 1/10 | 0/10 | 0/10 | 0/10 | 10/10 | 9/10 |

TABLE 5

| | EXAMPLE 1 | | | | EXAMPLE 2 | | | |
|---|---|---|---|---|---|---|---|---|
| | BEFORE HIGH TEMPERATURE EXPOSURE TEST | | AFTER HIGH TEMPERATURE EXPOSURE TEST | | BEFORE HIGH TEMPERATURE EXPOSURE TEST | | AFTER HIGH TEMPERATURE EXPOSURE TEST | |
| | BREAKDOWN LIMIT [N] | FRACTURE SURFACE | BREAKDOWN LIMIT [N] | FRACTURE SURFACE | BREAKDOWN LIMIT [N] | FRACTURE SURFACE | BREAKDOWN LIMIT [N] | FRACTURE SURFACE |
| 1 | 21.4 | NOT REACHED | 19.9 | NOT REACHED | 20.1 | NOT REACHED | 16.7 | NOT REACHED |
| 2 | 14.0 | NOT REACHED | 21.8 | NOT REACHED | 19.1 | NOT REACHED | 18.5 | NOT REACHED |
| 3 | 19.1 | NOT REACHED | 12.7 | REACHED | 22.7 | NOT REACHED | 20.5 | NOT REACHED |
| 4 | 23.5 | NOT REACHED | 18.8 | REACHED | 21.6 | NOT REACHED | 18.2 | NOT REACHED |
| 5 | 21.7 | NOT REACHED | 19.8 | NOT REACHED | 23.2 | NOT REACHED | 19.9 | NOT REACHED |
| 6 | 22.1 | NOT REACHED | 17.0 | NOT REACHED | 21.0 | NOT REACHED | 18.7 | NOT REACHED |
| 7 | 25.0 | NOT REACHED | 18.6 | NOT REACHED | 23.9 | NOT REACHED | 21.0 | NOT REACHED |
| 8 | 20.3 | NOT REACHED | 16.7 | NOT REACHED | 23.7 | NOT REACHED | 15.5 | NOT REACHED |
| 9 | 27.4 | NOT REACHED | 8.6 | REACHED | 25.3 | NOT REACHED | 20.5 | NOT REACHED |
| 10 | 17.7 | NOT REACHED | 20.9 | NOT REACHED | 22.2 | NOT REACHED | 18.3 | NOT REACHED |
| ave | 21.23 | | 17.49 | | 22.28 | | 18.78 | |
| max | 27.37 | | 21.82 | | 25.30 | | 21.00 | |
| min | 14.03 | | 8.59 | | 19.10 | | 15.50 | |
| σ | 3.768 | | 4.052 | | 1.878 | | 1.759 | |

| | EXAMPLE 3 | | | | EXAMPLE 4 | | | |
|---|---|---|---|---|---|---|---|---|
| | BEFORE HIGH TEMPERATURE EXPOSURE TEST | | AFTER HIGH TEMPERATURE EXPOSURE TEST | | BEFORE HIGH TEMPERATURE EXPOSURE TEST | | AFTER HIGH TEMPERATURE EXPOSURE TEST | |
| | BREAKDOWN LIMIT [N] | FRACTURE SURFACE | BREAKDOWN LIMIT [N] | FRACTURE SURFACE | BREAKDOWN LIMIT [N] | FRACTURE SURFACE | BREAKDOWN LIMIT [N] | FRACTURE SURFACE |
| 1 | 22.9 | NOT REACHED | 17.8 | NOT REACHED | 20.9 | NOT REACHED | 15.5 | NOT REACHED |
| 2 | 16.7 | NOT REACHED | 20.3 | NOT REACHED | 16.3 | NOT REACHED | 20.8 | NOT REACHED |
| 3 | 24.4 | NOT REACHED | 20.5 | NOT REACHED | 21.2 | NOT REACHED | 21.9 | NOT REACHED |
| 4 | 19.0 | NOT REACHED | 19.4 | NOT REACHED | 22.5 | NOT REACHED | 16.6 | NOT REACHED |
| 5 | 23.8 | NOT REACHED | 18.3 | NOT REACHED | 23.6 | NOT REACHED | 18.0 | NOT REACHED |
| 6 | 18.2 | NOT REACHED | 17.5 | NOT REACHED | 22.5 | NOT REACHED | 19.8 | NOT REACHED |
| 7 | 24.3 | NOT REACHED | 18.7 | NOT REACHED | 24.3 | NOT REACHED | 19.4 | NOT REACHED |
| 8 | 24.5 | NOT REACHED | 15.3 | NOT REACHED | 21.4 | NOT REACHED | 17.1 | NOT REACHED |
| 9 | 24.5 | NOT REACHED | 18.9 | NOT REACHED | 26.4 | NOT REACHED | 18.4 | NOT REACHED |
| 10 | 24.5 | NOT REACHED | 19.7 | NOT REACHED | 19.6 | NOT REACHED | 20.4 | NOT REACHED |
| ave | 22.26 | | 18.64 | | 21.87 | | 18.78 | |
| max | 24.55 | | 20.50 | | 26.43 | | 21.91 | |
| min | 16.66 | | 15.32 | | 16.28 | | 15.47 | |
| σ | 3.073 | | 1.534 | | 2.759 | | 2.032 | |

TABLE 6

| | | COMPARATIVE EXAMPLE 1 | | | | COMPARATIVE EXAMPLE 2 | | | |
|---|---|---|---|---|---|---|---|---|---|
| | | BEFORE HIGH TEMPERATURE EXPOSURE TEST | | AFTER HIGH TEMPERATURE EXPOSURE TEST | | BEFORE HIGH TEMPERATURE EXPOSURE TEST | | AFTER HIGH TEMPERATURE EXPOSURE TEST | |
| | | BREAK-DOWN LIMIT [N] | FRACTURE SURFACE | BREAK-DOWN LIMIT [N] | FRACTURE SURFACE | BREAK-DOWN LIMIT [N] | FRACTURE SURFACE | BREAK-DOWN LIMIT [N] | FRACTURE SURFACE |
| SAMPLE NUMBER | 1 | 19.2 | NOT REACHED | 11.4 | REACHED | 19.9 | NOT REACHED | 19.2 | NOT REACHED |
| | 2 | 20.3 | NOT REACHED | 5.1 | REACHED | 18.9 | NOT REACHED | 6.0 | REACHED |
| | 3 | 15.8 | NOT REACHED | 13.1 | REACHED | 21.6 | NOT REACHED | 13.7 | REACHED |
| | 4 | 18.7 | NOT REACHED | 6.0 | REACHED | 21.8 | NOT REACHED | 16.6 | NOT REACHED |
| | 5 | 21.0 | NOT REACHED | 10.6 | REACHED | 21.3 | NOT REACHED | 6.5 | REACHED |
| | 6 | 17.1 | NOT REACHED | 10.7 | REACHED | 19.1 | NOT REACHED | 8.2 | REACHED |
| | 7 | 18.6 | NOT REACHED | 6.7 | REACHED | 22.4 | NOT REACHED | 12.3 | REACHED |
| | 8 | 19.9 | NOT REACHED | 6.4 | REACHED | 22.4 | NOT REACHED | 9.0 | REACHED |
| | 9 | 18.3 | NOT REACHED | 10.8 | REACHED | 25.3 | NOT REACHED | 8.1 | REACHED |
| | 10 | 16.1 | NOT REACHED | 7.5 | REACHED | 21.6 | NOT REACHED | 14.5 | REACHED |
| ave | | 18.50 | | 8.83 | | 21.43 | | 11.42 | |
| max | | 21.00 | | 13.10 | | 25.30 | | 19.18 | |
| min | | 15.80 | | 5.10 | | 18.91 | | 6.02 | |
| σ | | 1.733 | | 2.779 | | 1.856 | | 4.509 | |

(4) Experimental Results

First, the experimental results through Evaluation Method 1 will be discussed.

As shown in Table 4, since the samples used for Example 1 had the Pd layers and the thickness of each Ni layer of each sample was about 0.4 μm, the Ni—Sn intermetallic compound that was produced when solder was melted was formed on the Pd layers. Therefore, solder did not erode any base electrode layer and no void was formed between each base electrode layer and the corresponding solder and metal layer in the nine samples out of the 10 samples.

Since each set of the samples used for Example 2 to Example 4 had the Pd layers and the thickness of each Ni layer of each sample was greater than or equal to about 0.4 μm, the Ni—Sn intermetallic compound that was produced when solder was melted was sufficiently formed on the Pd layers. Therefore, solder did not erode any base electrode layer and no void was formed between each base electrode layer and the corresponding solder and metal layer.

On the other hand, as shown in Table 4, in Comparative Example 1, since no Ni layer was formed, an Ni—Sn intermetallic compound that was produced when solder was melted was not formed on the Pd layers. Therefore, solder eroded at least any one of the base electrode layers and a void was formed between the base electrode layer and the solder and metal layer in the 10 samples out of the 10 samples.

In Comparative Example 2, since the thickness of each Ni layer was about 0.3 μm, the Ni—Sn intermetallic compound that was produced when solder was melted was not sufficiently formed on the Pd layers. Therefore, in Comparative Example 2, solder eroded at least any one of the base electrode layers and a void was formed between the base electrode layer and the solder and metal layer in the nine samples out of the 10 samples.

Next, the experimental results through Evaluation Method 2 will be discussed.

As shown in Table 5, in Example 1, since the thickness of each Ni layer was about 0.4 μm, the Ni—Sn intermetallic compound that was produced when solder was melted was formed on the Pd layers. Therefore, the fracture surface did not reach the inside of the base electrode layers in the seven samples out of the 10 samples. The average of the breakdown limits before the high temperature exposure test was about 21.23 N. The average of the breakdown limits after the high temperature exposure test was about 17.49 N. This decrease in breakdown limit is presumably due to deterioration of solder. Therefore, no large decrease in breakdown limit was found.

In Example 2, since the thickness of each Ni layer was about 0.6 μm, the Ni—Sn intermetallic compound that was produced when solder was melted was sufficiently formed on the Pd layers. Therefore, the fracture surface did not reach the inside of the base electrode layers in the 10 samples out of the 10 samples. The average of the breakdown limits before the high temperature exposure test was about 22.28 N. The average of the breakdown limits after the high temperature exposure test was about 18.78 N. This decrease in breakdown limit is presumably due to deterioration of solder. Therefore, no large decrease in breakdown limit was found.

In Example 3, since the thickness of each Ni layer was about 0.8 μm, the Ni—Sn intermetallic compound that was produced when solder was melted was sufficiently formed on the Pd layers. Therefore, the fracture surface did not reach the inside of the base electrode layers in the 10 samples out of the 10 samples. The average of the breakdown limits before the high temperature exposure test was about 22.26 N. The average of the breakdown limits after the high temperature exposure test was about 18.64 N. This decrease in breakdown limit is presumably due to deterioration of solder. Therefore, no large decrease in breakdown limit was found.

In Example 4, since the thickness of each Ni layer was about 1.0 μm, the Ni—Sn intermetallic compound that was produced when solder was melted was sufficiently formed on the Pd layers. Therefore, the fracture surface did not reach the inside of the base electrode layers in the 10 samples out of the 10 samples. The average of the breakdown limits before the high temperature exposure test was about 21.87 N. The average of the breakdown limits after the high temperature exposure test was about 18.78 N. This decrease in breakdown limit is presumably due to deterioration of solder. Therefore, no large decrease in breakdown limit was found.

On the other hand, as shown in Table 6, in Comparative Example 1, since no Ni layer was formed, an Ni—Sn intermetallic compound that was produced when solder was melted was not formed on the Pd layers. Therefore, the fracture surface reached the inside of the base electrode layers in the 10 samples out of the 10 samples. The average of the breakdown limits before the high temperature exposure test was about 18.50 N. The average of the breakdown limits after the high temperature exposure test was about 8.83 N. Therefore, adhesion significantly deteriorated.

In Comparative Example 2, since the thickness of each Ni layer was about 0.3 µm, the Ni—Sn intermetallic compound that was produced when solder was melted was not sufficiently formed on the Pd layers. Therefore, the fracture surface reached the inside of the base electrode layers in the eight samples out of the 10 samples. The average of the breakdown limits before the high temperature exposure test was about 21.43 N. The average of the breakdown limits after the high temperature exposure test was about 11.42 N. Therefore, adhesion significantly deteriorated.

From the above results, it was verified that, with the multilayer ceramic capacitors and the mounting structure for a multilayer ceramic capacitor according to Examples, the Ni—Sn intermetallic compound that was produced when solder was melted was sufficiently formed on the Pd layers, and the Pd layers advantageously functioned as strong barrier layers against the intermetallic compound Ni—Sn alloy, and, in addition, when the multilayer ceramic capacitors were exposed to high temperature for a long period of time as well, Ni did not disperse into solder and tended to remain on the surface of Pd, so the Pd layers and the Ni—Sn intermetallic compound layers also functioned as excellent barrier layers against solder over time as well.

Therefore, it was verified that, with the above features, with the multilayer ceramic capacitors and the mounting structure for a multilayer ceramic capacitor according to Examples, for example, even in an operational environment in which the temperature exceeds about 200 degrees C., short-time solder leaching and solder leaching that occurs over time were reduced or prevented.

The preferred embodiments of the present invention are described above. However, the present invention is not limited to the preferred embodiments.

That is, various modifications in mechanism, shape, material, number, amount, location, disposition, or the like, may be added to the above-described preferred embodiments without departing from the technical idea and object of the present invention. The present invention also encompasses those modifications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminate including:
a plurality of laminated ceramic layers; and
a plurality of internal electrode layers respectively laminated on the ceramic layers, the laminate including a first main surface and a second main surface on opposite sides in a lamination direction, a first end surface and a second end surface on opposite sides in a longitudinal direction perpendicular or substantially perpendicular to the lamination direction, and a first side surface and a second side surface on opposite sides in a width direction perpendicular or substantially perpendicular to the lamination direction and the longitudinal direction; and
an outer electrode located on each of the first end surface and the second end surface; wherein
each outer electrode includes a metal layer including at least a Pd layer, an Ni layer, and an Sn layer laminated in the order of the Pd layer, the Ni layer, and the Sn layer from a side close to the laminate;
the metal layers are located at an outermost surface of the outer electrodes;
a thickness of each Ni layer is greater than or equal to about 0.4 µm;
in each outer electrode, the Ni layer is completely covered by the Sn layer; and
in each outer electrode, an end of at least one of the Pd layer, the Ni layer, and the Sn layer extends to the laminate.

2. The multilayer ceramic electronic component according to claim 1, wherein
each outer electrode further includes a base electrode layer provided between the laminate and the corresponding metal layer;
each base electrode layer is electrically connected to one or more of the plurality of internal electrode layers; and
each base electrode layer is in direct contact with the laminate.

3. The multilayer ceramic electronic component according to claim 2, wherein each base electrode layer includes an electrically conductive metal and a glass component.

4. The multilayer ceramic electronic component according to claim 2, wherein
a thickness of each base electrode layer in the lamination direction is greater than or equal to about 15 µm and less than or equal to about 160 µm; and
a thickness of each base electrode layer in the longitudinal direction is greater than or equal to about 5 µm and less than or equal to about 40 µm.

5. The multilayer ceramic electronic component according to claim 1, wherein each metal layer is a plating layer.

6. The multilayer ceramic electronic component according to claim 5, wherein a thickness of each Pd layer is greater than or equal to about 0.04 µm.

7. The multilayer ceramic electronic component according to claim 1, wherein the thickness of each Ni layer is equal to or greater than about 0.6 µm.

8. The multilayer ceramic electronic component according to claim 1, wherein each Pd layer is a sintered metal layer that includes glass.

9. The multilayer ceramic electronic component according to claim 8, wherein a thickness of each Pd layer is greater than or equal to about 15 µm and less than or equal to about 160 µm.

10. A mounting structure for a multilayer ceramic electronic component mounted on a circuit board, the mounting structure comprising:
the multilayer ceramic electronic component comprising a laminate and outer electrodes; and
the circuit board; wherein
the laminate includes:
a plurality of laminated ceramic layers; and
a plurality of internal electrode layers respectively laminated on the ceramic layers, the laminate including a first main surface and a second main surface on opposite sides in a lamination direction, a first end surface and a second end surface on opposite sides in a longitudinal direction perpendicular or substantially perpendicular to the lamination direction, and a first side surface and a second side surface on opposite sides in a width direction perpendicular or substantially perpendicular to the lamination direction and the longitudinal direction;

the outer electrodes are located on each of the first end surface and the second end surface of the laminate;

each outer electrode includes a metal layer including at least a Pd layer, an Ni layer, and an Sn layer laminated in the order of the Pd layer, the Ni layer, and the Sn layer from a side close to the laminate;

the metal layers are located at an outermost surface of the outer electrodes;

a thickness of each Ni layer is greater than or equal to about 0.4 μm;

in each outer electrode, the Ni layer is completely covered by the Sn layer;

in each outer electrode, an end of at least one of the Pd layer, the Ni layer, and the Sn layer extends to the laminate; and the multilayer ceramic electronic component is mounted on land electrodes on the circuit board by lead-free solder.

11. The mounting structure for a multilayer ceramic electronic component according to claim 10, wherein each outer electrode further includes a base electrode layer provided between the laminate and the corresponding metal layer;

each base electrode layer is electrically connected to one or more of the plurality of internal electrode layers; and each base electrode layer is in direct contact with the laminate.

12. The mounting structure for a multilayer ceramic electronic component according to claim 11, wherein each base electrode layer includes an electrically conductive metal and a glass component.

13. The mounting structure for a multilayer ceramic electronic component according to claim 11, wherein a thickness of each base electrode layer in the lamination direction is greater than or equal to about 15 μm and less than or equal to about 160 μm; and a thickness of each base electrode layer in the longitudinal direction is greater than or equal to about 5 μm and less than or equal to about 40 μm.

14. The mounting structure for a multilayer ceramic electronic component according to claim 10, wherein each metal layer is a plating layer.

15. The mounting structure for a multilayer ceramic electronic component according to claim 14, wherein a thickness of each Pd layer is greater than or equal to about 0.04 μm.

16. The mounting structure for a multilayer ceramic electronic component according to claim 10, wherein the thickness of each Ni layer is equal to or greater than about 0.6 μm.

17. The mounting structure for a multilayer ceramic electronic component according to claim 10, wherein, in each outer electrode, the Ni layer and the Sn layer define a compound.

18. The mounting structure for a multilayer ceramic electronic component according to claim 10, wherein each Pd layer is a sintered metal layer that includes glass.

19. The mounting structure for a multilayer ceramic electronic component according to claim 18, wherein a thickness of each Pd layer is greater than or equal to about 15 μm and less than or equal to about 160 μm.

* * * * *